July 21, 1970     E. O. GILBERT     3,521,038
COMPUTER APPARATUS FOR MULTIPLYING TWO OR MORE ANALOG
QUANTITIES AND PROVIDING A DIGITAL OUTPUT
Filed May 29, 1968     2 Sheets-Sheet 1

INVENTOR.
EDWARD O. GILBERT

BY Richard G. Stephens

ATTORNEY

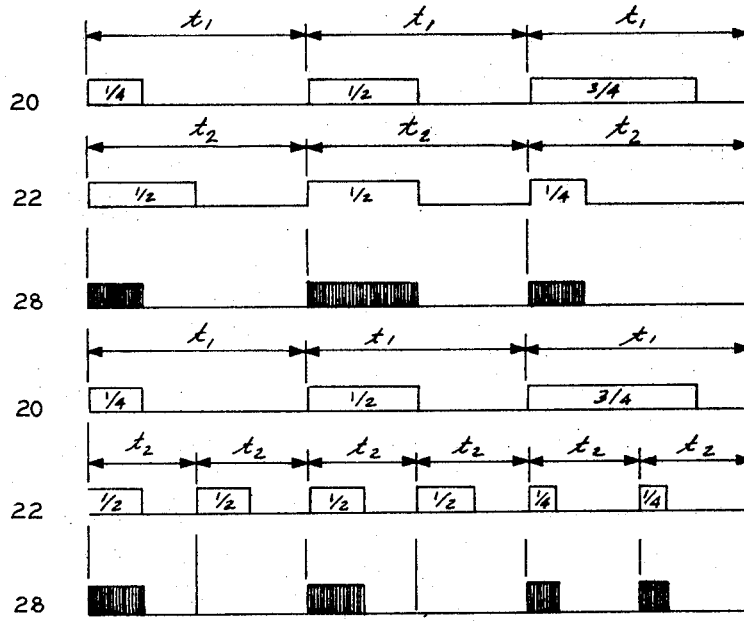
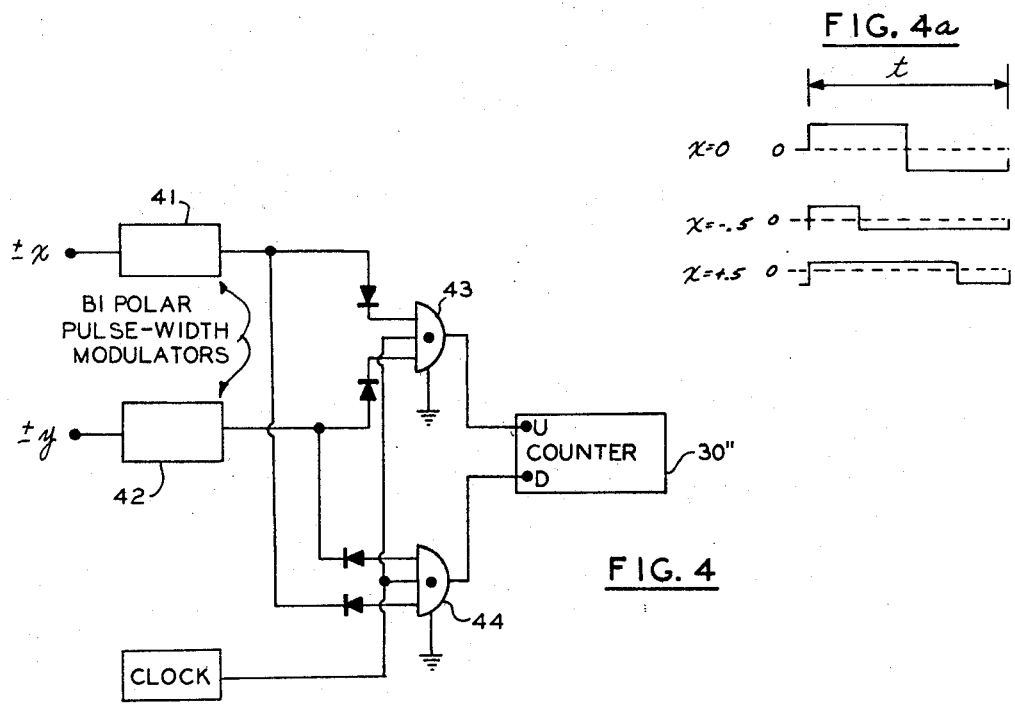

United States Patent Office 3,521,038
Patented July 21, 1970

3,521,038
COMPUTER APPARATUS FOR MULTIPLYING TWO OR MORE ANALOG QUANTITIES AND PROVIDING A DIGITAL OUTPUT
Edward O. Gilbert, Ann Arbor, Mich., assignor to Reliance Electric Company, a corporation of Ohio
Filed May 29, 1968, Ser. No. 733,042
Int. Cl. G06j 1/00
U.S. Cl. 235—150.52          14 Claims

ABSTRACT OF THE DISCLOSURE

Apparatus for multiplying two or more analog quantities and providing a digital signal commensurate with their product, and the time integral of their product, using economical equipment which is insensitive to temperature. The analog inputs are time-modulated by two or more pulse-width modulators which operate at irrationally-related repetition frequencies and the modulated waveforms are applied to a logical AND circuit which also receives high frequency clock pulses, thereby providing output pulses from the AND circuit. The time average of the output pulses may be made to vary accurately in accordance with the product of the input variables if the relationship between the modulator repetition rates tends to be irrational or incommensurable, and counting the pulses over a desired period of time provides a pulse count commensurate with the time integral of the product.

---

A variety of applications, particularly in the process and industrial control industries, require or desirably include fairly accurate multiplication of two or more analog quantities, with conversion of the product, or the time integral of the product, to a digital quantity. The weight of a constituent in an ore or slurry or the like on a conveyor belt which passes a given point during a given time interval may be determined, for example, by multiplying the instantaneous weight of the ore by the instantaneous belt velocity, for example, and then integrating the product over a period of time. The integrated product frequently is desired in digital form, to facilitate billing, for example, or to facilitate accurate long distance transmission of the data to a controller or an indicator.

A number of prior art systems which will satisfactorily perform such computation are undesirably expensive or unreliable, and often insufficiently accurate unless housed in temperature controlled environments. Many known analog systems incorporating electronic amplifiers operate satisfactorily insofar as multiplication is concerned, but amplifier drift often renders integration by means of such amplifiers quite inaccurate. A primary object of the present invention is to provide economical means for accurately multiplying two analog quantities, with accuracies of the order of 0.1 percent, to provide a product quantity, and a digital time integral of the product quantity, with apparatus which is very inexpensive and accurate over a wide range of temperatures. A central concept of the invention allowing accurate operation over a wide temperature range involves the use of a simple logic coincidence gate, such as an AND gate or NAND gate as the basic multiplying element, since the operation of such a gate is ordinarily quite insensitive to temperature.

Other objects of the invention will in part be obvious and will, in part, appear hereinafter.

The invention accordingly comprises the features of construction, combinations of elements, and arrangements of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which:

FIGS. 2a and 2b are waveform diagrams useful in understanding the operation of the invention.

FIG. 4 is a block diagram of a further form of multiplying-integrating system.

FIG. 4a is a waveform diagram illustrating the operation of the pulse-width modulators of FIG. 4.

Figure 1:
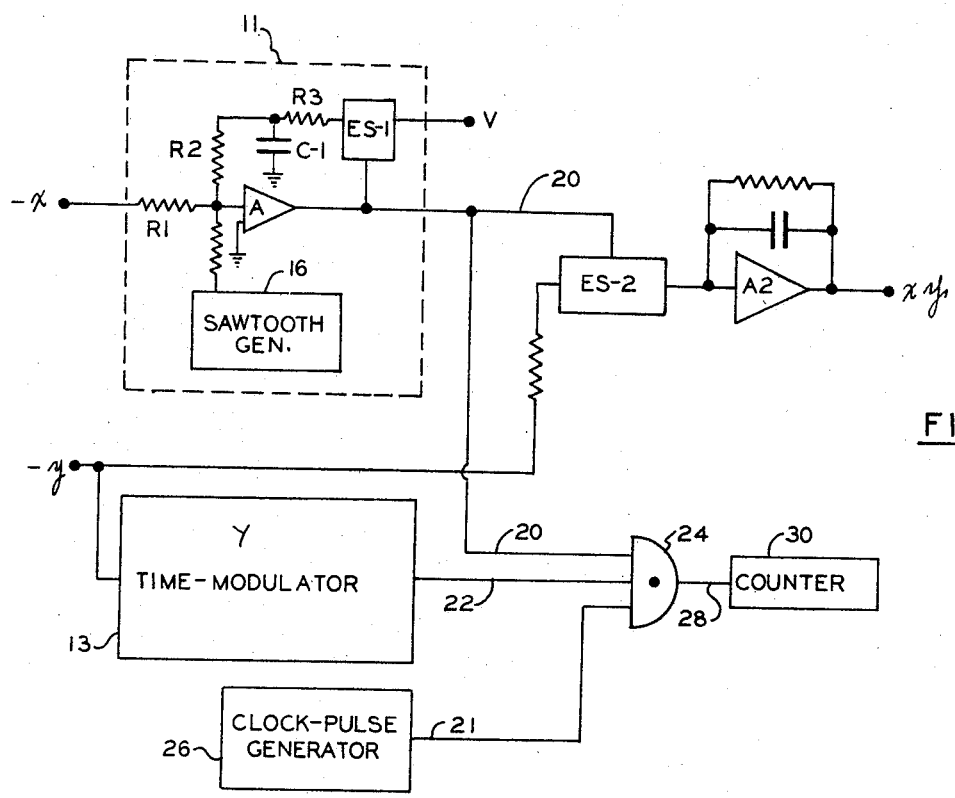
FIG. 1 is a schematic diagram illustrating one form of multiplying-integrating system constructed in accordance with the invention.

In FIG. 1 an input voltage commensurate with a first variable $x$ is applied to a first pulse width modulator shown within dashed lines at 11, and an input voltage commensurate with a second variable $y$ is applied to a similar second pulse width modulator shown as a block at 13. Pulse width modulator 11 is shown as including a high-gain over-driven or saturating amplifier A, an electronic switch ES–1, and a sawtooth generator 16. Modulator 13 may be similar to modulator 11 except that the sawtooth generator waveform in modulator 11 has a repetition rate $f_1$; while the sawtooth generator waveform in modulator 13 has a repetition rate $f_2$ different from $f_1$, with the difference or ratio between $f_1$ and $f_2$ being important, as will be explained below.

During one time period $t_1$, where $t_1$ equals $1/f_1$ seconds, sawtooth generator 16 provides a linearly-increasing ramp voltage to comparator 12. Neglecting for the moment any signal applied from electronic switch ES–1 via resistor R2 to amplifier A, it will be seen that during the initial portion of the $t_1$ time period when the $x$ input voltage exceeds the input from generator 16, saturating amplifier A will provide a "high" or provide logic "1" output signal on line 20. When the increasing ramp voltage exceeds the $x$ input voltage, the amplifier output signal switches, providing a low or logic "0" output signal on line 20 for the remainder of the $t_1$ time period. At the end of each $t_1$ period, sawtooth generator 16 resets to zero and begins a new cycle. If the sawtooth current from generator 16 varies linearly with time, it will be readily apparent that the time $t_x$ during each $t_1$ period that a logic "1" signal is provided on line 20 will be linearly proportional to the value of the $x$ input voltage.

The width $t_x$ or duty cycle of the signal on line 20 may be made still to vary quite linearly with the $x$ input voltage even though the output from generator 16 is quite non-linear by providing a negative feedback signal to be summed with the $x$ input current. In FIG. 1 such degenerative feedback is shown derived by electronic switch ES–1, which is controlled by the waveform on line 20 and operates to apply voltage pulses from a reference source V via a low-pass filter (R3, C–1) to the amplifier A input circuit. Pulse width modulator 13 acts in precisely the same manner to time-modulate the $y$ input signal to provide a waveform on line 22 having a duty cycle commensurate with the value of the $y$ input current, but with the repetition rate $f_2$ and the period $t_2$ of the waveform from modulator 13 differing from those ($f_1$ and $t_1$) of modulator 11. The time-modulator circuits 11 and 13 are both standard, well-known forms of pulse-width modulator, and many other known forms of pulse-width modulation systems may be substituted without departing from the invention. If the degenerative feedback waveform is arranged to vary in accordance with a further input variable $z$, such as by applying a $z$ voltage in lieu of the fixed V voltage to ES–1 in FIG. 1, the duty-cycle of the pulse width modulator output waveform will be commensurate with $x/z$ or $y/z$. Those skilled in the art will recognize that each of the time-modulators 11 and 13 may be constructed simply and economically to operate reliably and accurately over a wide temperature range and that none of those elements will "drift" appreciably as temperature changes. It is important to accuracy of the invention that the relationship between the two modulator repetition rates be maintained irrational or incommensurable, as will be explained below in greater detail. The accuracy depends upon the ratio between the two repetition rates, however, rather than upon the rates themselves, and if changes in temperature cause similar percentage changes in the repetition rates of both modulators, accuracy will not be impaired. Temperature-compensated crystals may be used to control the sawtooth generator repetition rates to a degree of accuracy far greater than that required, using inexpensive crystals which need not be temperature controlled. Crystal control is wholly unnecessary for many applications.

The output waveforms on lines 20 and 22 are applied to a conventional AND circuit 24, together with the square wave output signal from a high frequency clock pulse generator 26 applied to gate 24 via line 21. A logic "1" output signal occurs on line 28 whenever, and only whenever, all three of the input lines 20–22 to AND gate 24 carry logic "1" signals. The logic "1" output signals on line 28 are applied to a conventioned pulse counter 30. As will be better understood as the description proceeds, the time average of the pulses on line 28 will vary within reasonable accuracy with the product $xy$, and hence the count within counter 30 will be equal the time integral of the product $xy$. Those skilled in the art will recognize that operation of AND gate 24 and counter 30 is essentially wholly independent of temperature over a wide range of temperatures.

In FIG. 1 the time-modulated x waveform on line 20 is shown also connected to control electronic switch ES–2, thereby to modulate the $y$ input voltage. The output pulses from electronic switch ES–2 have an amplitude proportional to the $y$ input signal and a duty-cycle proportional to the $x$ input signal, and hence an "area" or time-average commensurate with the product $xy$. These output pulses are applied to low-pass filter means shown as comprising a DC amplifier A2 having resistive and capacitive feedback impedances, and the output voltage from amplifier A2 will be understood to be proportional to the product $xy$. For best accuracy, the characteristics of electronic switch ES–1 should not vary with temperature and amplifier A2 should be drift-stabilized. If purely capacitive feedback were used around amplifier A2, the output signal from the amplifier theoretically would comprise an analog voltage proportional to the desired time-integral of the $xy$ product, and an analog-to-digital converter could be used to convert such a voltage to a digital signal. However, the effects of drift accumulate over time in a feedback amplifier integrator, so that such a system becomes insufficiently accurate for many applications, and particularly those involving wide temperature variations. As well as being much more accurate than such a system, the AND gate multiplying-integrating arrangement shown in FIG. 1 eliminates the need for the mentioned analog-to-digital converter.

Rather than using electronic switch ES–2 to modulate the $y$ voltage with the $x$ duty-cycle and then filtering to derive the analog $xy$ product, such a product may be derived by use of a further AND gate (not shown) connected to receive the waveforms on lines 20 and 22, with the gate output being applied to a low-pass filter.

An important requirement of the invention is that the repetition rates $f_1$ and $f_2$ of the two pulse width modulators differ, as mentioned above, and indeed it is important that they differ so that the ratio between the two rates closely approaches irrationality, i.e. so that the ratio between the two repetition rates is not expressible as the ratio between two small integers, and further, so that the ratios between all of their lower order harmonics are not expressible with small integers. If the $x$ and $y$ input signals are assumed to vary between zero and maximum values of 1.0, the duty-cycles of the waveforms on lines 20 and 22 will similarly vary, of course, between values of zero and 1.0. In FIG. 2$a$, for sake of analysis the repetition rates of the two modulators are assumed to be the same, so that $t_1$ equals $t_2$. In FIG. 2$a$ the waveform on line 20 is shown first with a duty cycle of 25%, secondly with a duty cycle of 50% and thirdly with a duty cycle of 75%, as if the $x$ variable had values of .25, .50 and .75, while the waveform on line 22 assumes $y$ variable input values of .50, .50 and .25 during three similar time periods. During the first time period when $x$ equals .25 and $y$ equals .5, their product $xy$ evidently should be .25 times .5 or .125. The waveform on line 28, if one ignores the high frequency modulation imposed by the clock 26 input, will be seen to have a time width equal to one-fourth of the $t_1$, $t_2$ time period. During the third time period, where $x$ has a value of .75 and $y$ a value of .25, the waveform on line 28 will be seen again to have a duty cycle equal to one-fourth of the $t_1$, $t_2$ time period. Since .25 times .5 manifestly does not equal .75 times .25, a system such as that suggested in FIG. 2$a$ using identical repetition rates for the two modulators obviously would be grossly inaccurate.

In FIG. 2$b$ a similar set of waveforms is provided for an arrangement which assumes that repetition rate $f_2$ is exactly twice that of repetition rate $f_1$. It is immediately evident from the first time period shown in FIG. 2$b$ that the width of the pulse shown on line 28 remains the same as the width of the pulse on line 22 (equal to the $y$ input) varies between .5 and 1.0, indicating that a two-to-one relationship between the repetition rates also would result in great inaccuracy.

It may be proved mathematically, and may be demonstrated graphically and by means of the invention, that the time average of the pulses derived by "anding" the two pulse width modulator outputs will closely approach the product $xy$ if the relationships between the two repetition rates and their harmonics are selected to be properly irrational. In one successful embodiment of the invention a ratio of approximately 1.555 to 1 was selected, and an accuracy better than 0.1% was achieved.

The rectangular waveforms from the two pulse width modulators each comprise, in accordance with Fourier analysis, a fundamental frequency and a plurality of harmonics of higher frequency and decreasing amplitudes. When the two waveforms are combined by AND gate 24, the fundamental and harmonic frequencies "beat" to provide sum and difference frequencies. By selection of an irrational or incommensurable relationship between the two repetition rates, one can insure that the differences between the fundamentals and the harmonics which are cancelled out by the anding process are themselves high frequencies which contribute little to the time average of the output waveform from the AND circuit. The principle is most easily demonstrated by the following numerical examples wherein frequencies are shown in cycles per unit time.

EXAMPLE 1

| | Fundamental Harmonics | | | | | | | | |
|---|---|---|---|---|---|---|---|---|---|
| | 2 | 3 | 4 | 5 | 6 | 7 | 8 | 9 | 10 |
| 10 | 20 | 30 | 40 | 50 | 60 | 70 | 80 | | |
| 20 | 40 | 60 | 80 | 100 | 120 | 140 | 160 | | |

EXAMPLE 2

| 10 | 20 | 30 | 40 | 50 | 60 | 70 | 80 | | |
|---|---|---|---|---|---|---|---|---|---|
| 15 | 30 | 45 | 60 | 75 | 90 | 105 | 120 | | |

EXAMPLE 3

| 10 | 20 | 30 | 40 | 50 | 60 | 70 | 80 | 90 | 100 |
|---|---|---|---|---|---|---|---|---|---|
| 9 | 18 | 27 | 36 | 45 | 54 | 63 | 72 | 81 | 90 |

EXAMPLE 4

| 10 | 20 | 30 | 40 | 50 | 60 | 70 | 80 | 90 | 100 |
|---|---|---|---|---|---|---|---|---|---|
| 15.55 | 31.1 | 46.65 | 62.2 | 77.75 | 93.3 | 108.85 | 124.4 | 139.95 | 155.5 |

In Example 1 where a rational 2 to 1 ratio is assumed, it will be seen that one of the fundamental frequencies and many of the lower order harmonics will cancel, thereby providing very inaccurate multiplication, as was shown above in connection with FIG. 2a. In Example 2 the ratio (2 to 3) between the two repetition rates is slightly less rational so that neither of the fundamental frequencies will be cancelled, but it will be seen that a number of the low order harmonics (e.g. 30, 60) will cancel. The system of Example 3 will be seen to be preferable to that of Example 2 in that none of the lower order harmonics cancel, the 9th and 10th harmonics of the two repetition rates being the lowest harmonics of the same frequency. The system of Example 4 will be seen to be even preferable in that only an extremely high order harmonic (i.e. the 1555th) of the 10th cycle per unit time repetition rate will equal an extremely high order harmonic (i.e. the 1000th of the 15.55 cycle repetition rate. Thus by using a repetition rate relationship wherein the ratios between the two repetition rates, and the ratios between all of their lower order harmonics all approach mathematical irrationality, the time average of the waveform provided by the AND gate may be made to approach as closely as desired to the $xy$ product.

It will be seen that the ratios between the repetition rates in Examples 2 and 4 do not differ greatly percentagewise, but that the ratio of Example 4 provides much more accurate operation than that of Example 2, and hence it will be seen to be important that the ratio either not be allowed to vary appreciably, or if it is allowed to vary that the two repetition rates not be synchronized in any way. As mentioned above, wholly adequate frequency control may be easily provided with or without inexpensive crystals and without provision of a temperature-controlled environment.

The frequency of clock 26, while ordinarily much greater than either of the modulator repetition rates, will be seen to be largely a matter of choice depending upon how finely one wishes to resolve the $xy$ product, and whether or not the clock repetition rate is irrationally related to either of the modulator repetition rates is unimportant. Counter 30 may comprise any one of a large number of conventional pulse counters, and may count in binary form, decimal form or according to any desired code, and may be provided with conventional reset capability, etc. In one embodiment of the invention pulse width modulators 11 and 13 utilize repetition rates of 155.4 c.p.s. and 253.9 c.p.s., clock 26 operated at 1.0 mc., and counter 30 comprised a multi-bit-binary counter which was connected to pulse a further mechanical counter. The lower of the two repetition rates must be at least twice, and preferably many times as great, as the desired system bandwidth, and the clock generator repetition rate must be much greater than the higher of the two pulse-width modulator repetition rates.

The Fourier series expressing as a function of time the value of a rectangular wave having a repetition rate of $1/T_1$ and an "on" time of $\alpha T_1$ during each cycle is commonly written as follows:

$$f_1(t) = \alpha + \sum_{n=1}^{n=\infty} C_n \sin\left(2\pi \frac{t}{T_1} + \phi_n\right) \quad (1)$$

See, for example, pp. 1006–1119 of "Reference Data for Radio Engineers," 4th edition, Interational Telephone and Telegraph Corp. (New York), (1956), or Para. 4.11 and pages 900–903 of "Mathematical Handbook for Scientists and Engineers," by Korn and Korn, 2nd edition, McGraw-Hill, New York, 1961.

A similar expression for a different rectangular wave having a repetition rate of $1/T_2$ and an "on" time of $\beta T_2$ during each cycle may be written:

$$f_2(t) = \beta + \sum_{m=1}^{m=\infty} D_m \sin\left(2\pi \frac{t}{T_2} m + \gamma_m\right) \quad (2)$$

If two logic functions $f_1$ and $f_2$ are applied to a coincidence circuit such as an AND gate, the output 2 of the AND gate is known to be the logical product of the two functions.' Multiplying expression (1) by expression (2) provides:

$$g = f_1 \times f_2 = \alpha\beta + \alpha \sum_{m=1}^{m=\infty} D_m \sin\left(2\pi \frac{t}{T_2} m + \gamma_m\right)$$

$$+ \beta \sum_{n=1}^{n=\infty} C_n \sin\left(2\pi \frac{t}{T_1} n + \phi_n\right)$$

$$+ \left[\sum_{n=1}^{n=\infty} C_n \sin\left(2\pi \frac{t}{T_1} n + \phi_n\right)\right] \cdot$$

$$\left[\sum_{m=1}^{m=\infty} D_m \sin\left(2\pi \frac{t}{T_2} + \gamma_m\right)\right]$$

Evaluating the product expression above by assuming various values for $T_1$ and $T_2$, and averaging the value of the expression over a period T which is much greater than $T_1$ or $T_2$, one finds that the average of the last-three terms of the expression (i.e. those containing summation signs) will approach zero if $T_1$ and $T_2$ approach irrationality. Therefore, $$g_{\text{average}} = \frac{1}{T} \int_0^T g(t) dt \approx \alpha.\beta$$

if the relationship between $T_1$ and $T_2$ approaches irrationality.

Figure 3A:
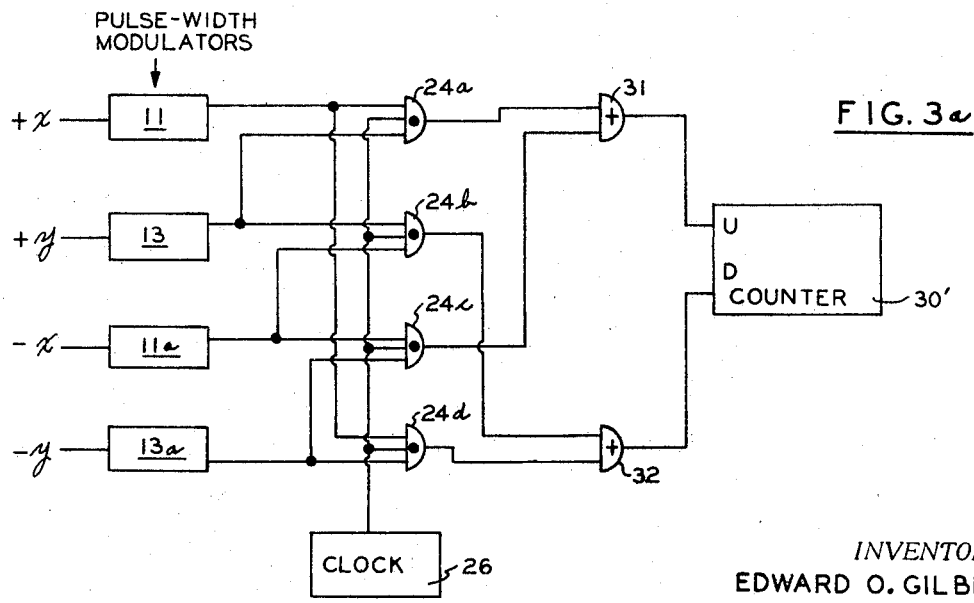
FIG. 3a is a block diagram of one type of four-quadrant multiplying-integrating system according to the invention.

The circuit of FIG. 1 will be seen to provide only "single-quadrant" multiplication, meaning that the $x$ and $y$ input signals must always have a given polarity, and the pulse-width modulator of FIG. 1 are assumed to respond to anly a single polarity of their input variables. FIG. 3a illustrates a four-quadrant arrangement utilizing two additional pulse-width modulators 11a and 13a and using four AND circuits instead of one. When both input signals are positive, time-modulated waveforms are applied from modulators 11 and 13 to AND gate 24a and thence through OR gate 31 to the "up" input line of up-down counter 30', and when both input signals are negative, waveforms are applied from modulators 11a and 13a to AND gate 24c, and thence through OR gate 31 to the "up" input line of the counter. When the two input signals differ in sign, waveforms are applied either from modulators 13 and 11a to AND gate 24b and thence to OR gate 32, or from modulators 11 and 13a to AND gate 24d and thence to OR gate 32, and in either case from OR gate 32 to the "down" input line of the counter. In constructing the pulse-width modulators of FIG. 3a, it will be apparent that a single sawtooth generator may drive both modulators 11 and 11a and that a single sawtooth generator may drive both modulators 13 and 13a, with the repetition rates of the two sawtooth generators irrationally related in the manner described in connection with FIG. 1.

While the pulse-width modulators of FIGS. 1 and 3 are each assumed to be responsive solely to a single polarity of input signal, and operable to provide a duty-cycle which varies from a zero value to zero input up to some maximum value, pulse-width modulators of a bi-polar type are well-known which provide a 50% duty-cycle for a zero input signal and which provide a duty cycle which decreases from 50 percent toward zero as the input signal increases in one direction, and which increases above 50 percent as the input signal increases in the opposite direction. Such variation of the duty cycle is illustrated in FIG. 4a. A multiplying system utilizing such bi-polar time-modulators is illustrated in FIG. 4. The output of each bi-polar time-modulator swings between a positive voltage with respect to ground and a negative voltage with respect to ground. The output of the $x$ pulse-width modulator 41 and the $y$ modulator 42 are both applied to AND gate 43 and to AND gate 44. AND gate 43 is assumed to be responsive only to positive voltages, and AND gate 44 is responsive only to negative voltages, as the inclusion of diodes in their input lines is intended to represent. Whenever the output voltages from both modulators is positive, or logic "1," clock pulses are gated through AND gate 43 to the "up" input line of counter 30", and whenever the output voltages from both modulators is negative, or logic "0," clock pulses are gated through AND gate 44 to the down input line of counter 30". Whenever one modulator output is positive and the other negative, neither AND circuit passes any clock pulses to the counter.

At this point it will become apparent that while the specifically disclosed apparatus time-modulates only two analog input signals and applies them as two inputs to an AND circuit, that it is within the scope of the invention to multiply three or more analog inputs by time-modulating each of them at respective repetition rates, all of which should similarly be irrationally related, and applying the modulator signals to an AND gate. It will be apparent that NAND gates and various other coincidence circuits providing logical AND or NAND functions may be substituted without departing from the invention. It will be readily apparent to those skilled in the art that a wide variety of electronic switches, generally of a simple diode type or a transistor type, are available for use as the electronic switches shown in FIG. 1.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawing shall be interpreted as illustrative and not in a limiting sense.

The embodiments of the invention in which an exclusive property or privilege is claimed are defined as follows:

1. Apparatus for multiplying first and second time-varying analog quantities and providing a digital signal commensurate with their product, comprising, in combination: first modulator means responsive to the first of said analog quantities and operative to provide a first bi-valued waveform having a first repetition rate $f_1$ and a duty cycle commensurate with said first of said analog quantities; second modulator means responsive to the second of said analog quantities and operative to provide a second bi-valued waveform having a second lesser repetition rate $f_2$ and a duty cycle commensurate with said second of said analog quantities, the ratio $f_1/f_2$ between said first and second repetition rates approaching an irrational number; and first coincidence circuit means responsive to said first and second waveforms and operative to provide a further waveform having a duty cycle commensurate with the product of said first and second analog quantities.

2. Apparatus according to claim 1 having means for providing a third bi-valued waveform at a third repetition rate greater than said first and second repetition rates, said coincidence circuit means being connected to be responsive to said third waveform; and pulse counter means responsive to said further waveform to provide a digital signal commensurate with the time integral of the product of said first and second analog quantities.

3. Apparatus according to claim 1 wherein each of said modulator means comprises oscillator means operable to provide an output signal and amplifier means responsive to said oscillator output signal and one of said analog quantities.

4. Apparatus according to claim 1 in which at least one of said modulator means is responsive to first and second input signals, and in which the ratio between the instantaneous magnitudes of said first and second input signals is commensurate with one of said analog quantities.

5. Apparatus according to claim 1 in which said first coincidence circuit means comprises an AND circuit.

6. Apparatus according to claim 1 in which said first coincidence circuit means comprises a NAND circuit.

7. Apparatus according to claim 1 wherein neither the fundamental repetition rate $f_1$ nor any of the harmonics $2f_1$ through $nf_1$ thereof equals the fundamental repitition rate $f_2$ nor any of the harmonics $2f_2$ through $nf_2$, where $n$ is an integer greater than 10.

8. Apparatus according to claim 1 having an electronic switch controlled by said first bi-valued waveform and connected to amplitude-modulate said second of said analog quantities to provide a third waveform; and low-pass filter means connected to receive said third waveform and provide an output voltage commensurate with said product.

9. Apparatus according to claim 1 having low-pass filter means responsive to said further waveform and operative to provide an output voltage commensurate with said product.

10. Apparatus according to claim 1 having third modulator means responsive to the first of said analog quantities and operative to provide a fourth bi-valued waveform having a duty cycle commensurate with the first of said analog quantities; fourth modulator means responsive to the second of said analog quantities and operative to provide a fifth bi-valued waveform having a duty cycle commensurate with the second of said analog quantities; second coincidence circuit means responsive to said second and fourth waveforms and operative to provide a sixth waveform; third coincidence circuit means responsive to said fourth and fifth waveforms and operative to provide a seventh waveform; and fourth coincidence circuit means responsive to said first and fourth waveforms and operative to provide an eighth waveform, said further waveform and said sixth, seventh and eighth waveforms each having a duty cycle commensurate with the product of said first and second analog quantities in a respective quadrant.

11. Apparatus according to claim 10 having first OR gate means for combining said further waveform and said seventh waveform to provide an output waveform on a first output line, second OR gate means for combining said sixth and eighth waveforms to provide an output waveform on a second output line; and a reversible counter having up and down input signal lines, said first and second output lines being connected respectively to said input signal lines.

12. Apparatus according to claim 10 in which said first and third modulator means comprise first and third comparator means each responsive to an input signal commensurate with said first analog quantity at a respective polarity of the input signal and each responsive to a further input signal having a repetition rate $f_1$, and in which said second and fourth modulator means comprise second and fourth comparator means each responsive to an input signal commensurate with said second analog quantity at a respective polarity of the input signal and each responsive to a further input signal having a repetition rate $f_2$.

13. The method of multiplying first and second quantities comprising the steps of width-modulating said first quantity at a first repetition rate $f_1$ to provide a first bi-valued signal having a duty cycle commensurate with said first quantity, width-modulating said second quantity at a second repetition rate $f_2$ to provide a second bi-valued signal having a duty cycle commensurate with said second number, and detecting coincidences between values of said ond quantity, the ratio $f_1/f_2$ approaching an irrational number, and detecting coincidences between values of said first and second bi-valued signals to provide a further signal having a duty cycle commensurate with the product of said first and second quantities.

14. The method according to claim 13 including the steps of modulating said further signal at a repetition rate greater than either $f_1$ or $f_2$ to provide output signals, and counting said output signals over predetermined periods of time to provide an indication of the time integral of the product of said first and second quantities.

References Cited

UNITED STATES PATENTS

| | | | |
|---|---|---|---|
| 3,057,555 | 10/1962 | Case | 235—194 X |
| 3,358,129 | 12/1967 | Schultz | 235 — 194 |
| 3,380,003 | 4/1968 | Bemmann | 307—229 X |
| 3,393,307 | 7/1968 | Courtenay et al. | 235—195 |
| 3,435,196 | 3/1969 | Schmid | 235—150.52 X |

MALCOLM A. MORRISON, Primary Examiner

JOSEPH F. RUGGIERO, Assistant Examiner

U.S. Cl. X.R.

235—194